2,910,408
PRODUCTION OF N-ACETYLGLUCOSAMINE

Seth Pope, Lionville, and Friedrich Zilliken, Philadelphia, Pa., assignors to American Home Products Corporation, New York, N.Y., a corporation of Delaware No Drawing. Application December 28, 1956
Serial No. 631,061

2 Claims. (Cl. 195—4)

This invention relates to an improved process for the production of N-acetylglucosamine. More particularly, it relates to the production of N-acetylglucosamine by a fermentation process wherein a mold of the Aspergillus genus is propagated in a medium containing chitin.

Chitin is readily available from invertebrates, such as from the shells or carapaces of lobsters, crabs or other crustaceans, and from insect sources, such as beetles. While it is now understood that various molds will degrade chitin to simpler organic compounds, the degradation ordinarily does not stop at the N-acetylglucosamine stage. In accordance with my improved process, however, the action of the species of Aspergillus employed on the chitin is carefully controlled so that a high yield of the desired compound, N-acetylglucosamine, results.

Previously, where chitin or chitin-containing materials were degraded by fungi, N-acetylglucosamine, if produced in any appreciable quantity at all, was so retained within the mycelium of the mold that it could not be readily recovered from the propagation medium. We have now found that if the aerobic fermentation conditions necessary during the propagation of a mold of the Aspergillus genus are changed to anaerobic after the fermentation has proceeded for a period of time, as, for example, by saturating the medium with carbon dioxide gas, the N-acetylglucosamine, which is adsorbed by the mycelium and otherwise held in a form in which it is not easily recovered from the medium, is converted to a form in which it may be easily recovered by recovery operations wherein adsorbing agents for the N-acetylglucosamine are utilized.

One of the objects of this invention is therefore the provision of a fermentation method for the production of N-acetylglucosamine from chitin wherein a mold of the Aspergillus genus is employed, which method results in high yields of easily recoverable N-acetylglucosamine.

Another object of our invention is the provision of a fermentation method for the production of N-acetylglucosamine in chitin-containing nutrient mediums wherein the aerobic conditions under which the mold is grown in order to accomplish the degradation of chitin to N-acetylglucosamine are changed to anaerobic prior to the conclusion of the fermentation, thereby effectively releasing N-acetylglucosamine from the mycelium and elsewhere in the nutrient medium so that it may be recovered from the clarified fermentation broth by the customary adsorption and elution methods.

Still another object of my invention is the provision of an effective recovery method by which the clarified broth, at the conclusion of the fermentation, may be treated with suitable adsorbing agents to adsorb the N-acetylglucosamine, the desired chemical compound being then secured from the adsorbent in the substantially pure form.

The foregoing objects, as well as other objects of this invention, will be apparent from the ensuing disclosure of certain preferred methods for practicing the same.

The chitin, which is the starting material degraded by fungus action in accordance with our improved process for the production of N-acetylglucosamine, may be secured from various sources. Ordinarily, however, crustacean shells, such as the shells of shrimp, crabs and lobster will be found to be the most satisfactory commercial source.

Although not essential, it is frequently desirable to subject chitin secured from one of these sources to preliminary purification before it is added to the nutrient fermentation medium. The chitin, as secured by chemical treatment of the crustacean shell in accordance with methods which are well understood by chemists, may first be dissolved in a concentrated acid, such as concentrated hydrochloric acid. It is then reprecipitated from this concentrated acid by the addition of water. Following this, it is washed with water, several changes of water being employed, until the pH of a suspension of the material in water falls within the pH range 2.5 to 4.0.

In preparing the nutrient medium in which the species of Aspergillus mold is propagated, ordinarily sufficient chitin in the form of a white, finely divided suspension should be added to maintain a chitin concentrate in the medium ranging from about 0.1 percent to about 0.5 percent by weight. In addition to the chitin it is necessary, in order that proper growth of the fungus may be secured, to have present at least minimal amounts of the elements, potassium, phosphorus, magnesium, nitrogen and sulfur. For the potassium, phosphorus, magnesium and sulfur, it is preferred to supply these elements to the growth medium in the form of inorganic salts. One mineral salt, of course, may supply more than one element. Nitrogen may also be supplied in the form of an inorganic salt, or it may be provided in the nutrient medium from an organic source thereof. However, better results may be obtained by the use of inorganic nitrogen sources.

Ordinarily it is preferred to supply sources of potassium, phosphorus, magnesium, nitrogen and sulfur for the microorganism growth such that the medium will contain not much over the minimal amounts of these elements which are necessary to support microorganism growth. In this way recovery of the N-acetylglucosamine is facilitated, since it need be separated only from low concentrations of the salts in the filtered broth at the end of the process. However, it is of course also possible to introduce more than minimal amounts of these elements into nutrient mediums in which the mold is to be propagated, although there are ordinarily no advantages in having these constituents present in amounts considerably exceeding the minimum.

Prior to inoculation with the microorganism strain the pH of the nutrient medium is carefully adjusted so that it falls within the range 3.5 to 6.0. For most satisfactory propagation it is preferred to start the fermentation with the nutrient medium at a pH closely approximating 3.5, i.e. at or near the lower end of the preferred pH range. It has been observed that the pH of the medium rises during the propagation, and that the final pH of the broth from which the N-acetylglucosamine is recovered will roughly fall within the pH range 5.2 to 6.0.

The vessel in which the fermentation is carried out is filled with the growth medium, containing chitin and ingredients supplying at least minimal amounts of the elements potassium, phosphorus, magnesium, nitrogen and sulfur. The medium is then sterilized by steam under pressure. It is then inoculated with growing mycelium of the fungus strain and allowed to ferment at a temperature of about 32° C. for 20 to 24 hours under aerobic conditions. Various strains of fungi of the Aspergillus genus give high yields of N-acetylglucosamine, and among preferred strains *Aspergillus terreus* and *Aspergillus alliaceus* may be especially mentioned.

Aerobic conditions during the fermentation can be most easily maintained by blowing air through the fermentor. The use of an agitating mechanism to insure thorough dispersion throughout the medium is advantageous, especially in processes carried out under industrial-scale conditions, but mechanical agitation does not appear to be essential.

In order to increase the yield of N-acetylglucosamine it has been found advantageous to add additional chitin before the fermentation is complete. A suspension of chitin containing an amount of chitin sufficient to make the chitin concentration of the medium fall within the range of 0.1 percent to 0.5 percent may be added to the contents of the fermentor some time within a period of 8 to 20 hours after the start of fermentation, or when visual examination of the medium shows that all or nearly all of the chitin originally supplied has disappeared. Alternatively, in place of adding a suspension of chitin, a suspension of chitin and a sugar such as glucose may be added, the amount of chitin supplied being sufficient to make the chitin concentration in the fermenting medium fall within the specified range.

It has been observed that during fermentation under aerobic conditions, especially where the period of fermentation is relatively short, very little N-acetylglucosamine seems to be produced in the medium as evidenced by the Elson-Morgan test. Presumably N-acetylglucosamine is produced by the process, but it is adsorbed by the mycelium of the microorganism as soon as it is split off from the chitin molecule. Its presence is therefore not shown by the Elson-Morgan tests, as it is not recoverable from the medium by ordinary recovery methods, i.e. by adsorption on an adsorbent and elution therefrom.

Accordingly, I have found it advantageous at the end of from 20 to 24 hours from the beginning of the fermentation, when the conversion of chitin to N-acetylglucosamine is relatively complete, to stop the aerobic fermentation and maintain anaerobic conditions in the medium for a time. This is most easily accomplished by stopping the aeration and introducing carbon dioxide gas in place of air into the contents of the fermentor. At this time an additional suspension of chitin may also be added to the medium.

Although the most desirable rate of gas flow will vary to some extent with the type of fermentor used and contents of the fermentor, it has been found most desirable to maintain a flow of carbon dioxide gas such that 0.3 volume of gas per volume of liquid in the fermentor is introduced per minute. The medium should be thoroughly saturated with carbon dioxide at this stage. This appears to serve the function of releasing N-acetylglucosamine from the mycelium of the growing fungus, either by elution therefrom, or by stimulation of enzymes present in the mycelium. It has been found desirable to maintain anaerobic conditions (following the aerobic propagation) for periods of time ranging up to 16 hours, 18 hours or longer. The broth is then removed from the fermentation vessel, filtered to remove the mycelium of the microorganism, and treated to recover N-acetylglucosamine therefrom.

In recovering N-acetylglucosamine from the clarified broth the use of an adsorbent agent, such as activated carbon, has been found to give most satisfactory results. In one such recovery method the filtered broth is treated with activated carbon for 30 minutes at room temperature. This may be done by introducing activated carbon into the filtered broth, or carbon in columnar form may be utilized. The carbon is then filtered off or otherwise separated from the broth and washed with water to remove impurities, such as mineral salts which may be present thereon. The carbon is then eluted with an eluting agent in order to yield a solution of N-acetylglucosamine from which the compound can be recovered in substantially pure form.

It is possible to use various eluting liquids, for example, the adsorbent may be eluted with a dilute aqueous acid, especially a mineral acid. However, in order to facilitate concentration of the eluate, it is preferred to elute the carbon to free the adsorbed N-acetylglucosamine with an alcoholic solution. Ordinarily an amount of aqueous ethanol equivalent in volume to one-third the original volume of the broth is utilized, this aqueous alcoholic eluting agent containing from 5 percent to 10 percent of ethanol on the volume basis. The elution is repeated at least once, and may be repeated several times; the eluates combined; and the liquid then concentrated. N-acetylglucosamine is then crystallized from the concentrated liquid and recovered in solid form.

Alternative recovery methods for recovering N-acetylglucosamine from the clarified broth may also be used. In one such method, for example, the greater portion of the impurities present in the clarified broth are first removed; as by treating the broth with ion exchange resins which adsorb these impurities. The purified solution is then treated with an adsorbing agent such as activated carbon, whereupon the N-acetylglucosamine is adsorbed thereon. It may be eluted therefrom by treatment of the adsorbent with a dilute aqueous acid, or with an aqueous solution of alcohol, following the procedure described.

The following examples illustrate the invention:

*Example 1*

An aqueous fermentation medium containing the following constituents in the amounts noted was prepared:

| | Percent by weight |
|---|---|
| Chitin | 0.10 |
| Potassium dihydrophosphate—$KH_2PO_4$ | 0.15 |
| Magnesium sulfate—$MgSO_4$ | 0.05 |
| Ammonium nitrate—$NH_4NO_3$ | 0.05 |

The medium was adjusted to a pH of 3.5 and sterilized by steam in a 50 gallon tank under pressure. It was then seeded with a 10 percent inoculum of growing mycelium of *Aspergillus terreus* and allowed to ferment at 32° C. for 24 hours. During the propagating of the microorganism the contents of the vessel were aerated at the rate of one volume of air per volume of liquid in the vessel per minute.

After 20 hours of fermentation 0.1 percent of chitin was added to the fermentation vessel and fermentation continued. At the end of 24 hours the introduction of air was stopped, and carbon dioxide gas supplied at the rate of 0.3 volume of gas per volume of liquid in the fermentation vessel per minute. At the same time there were added to the contents of the vessel 0.1 percent of chitin and 0.1 percent of glucose.

The fermentation was allowed to proceed in the presence of carbon dioxide gas for 16 hours. The broth was then harvested, the mycelium removed, and N-acetylglucosamine recovered from the clarified broth. As determined by the Elson-Morgan test this clarified broth contains 0.84 milligram of N-acetylglucosamine per milliliter.

The recovery procedure was as follows. The clear broth was adjusted to a pH of 2.0 by the use of hydrochloric acid, and then treated with an ion exchange resin for 30 minutes. The resin employed was Amberlite IR 120H of Rohm and Haas Company, Philadelphia, Pa. The broth was then filtered, adjusted to a pH of 7.0 by the use of sodium hydroxide solution, and treated with a second ion exchange resin for 30 minutes. The resin employed in this treatment was Amberlite IR 4B of the Rohm and Haas Company, Philadelphia, Pa. The broth was then filtered, its pH adjusted to 5.0, and then treated with 5 percent of activated carbon for 30 minutes at room temperature. The carbon was then filtered off, washed with a volume of water equal to one-third of the original volume of liquid and eluted. The eluting liquid was a 5 percent aqueous solution of ethanol, the volume of eluting liquid employed being equal to one-third that of the original volume of the broth. This first elution was followed by a second elution using 10 percent aqueous solution of ethanol in the same relative proportions per volume.

The eluates were combined and the liquid concentrated under reduced pressure. Crystals of N-acetylglucosamine formed and were removed from the mother liquor by filtration. The recovery was approximately 60 percent of the theoretical, there being recovered 50.4 grams of the pure N-acetylglucosamine product.

Example 2

An aqueous fermentation medium containing the following constituents in the amounts noted was prepared:

| | Percent by weight |
|---|---|
| Chitin | 0.10 |
| Potassium dihydrophosphate—$KH_2PO_4$ | 0.15 |
| Magnesium Sulfate—$MgSO_4$ | 0.05 |
| Ammonium Nitrate—$NH_4NO_3$ | 0.05 |

The medium was sterilized in a fermentor under steam pressure and then seeded with a 10 percent inoculum of *Aspergillus alliaceus* mycelium. The broth was then fermented at 32° C. for 24 hours, air being supplied thereto, and the contents of the fermentation vessel agitated. At the end of 24 hours additional chitin in the amount of 0.1 percent, together with enough glucose to provide a concentration of 0.1 percent in the fermentor, were added. The air flow was then stopped, and carbon dioxide supplied in place of the air, the amount of carbon dioxide gas supplied being 0.3 volume per volume of liquid in the fermentor per minute. Fermentation was then continued for an additional 16 hours, at the end of which time the broth was filtered to free it from the mycelium and N-acetylglucosamine recovered therefrom. The procedure followed in isolating the N-acetylglucosamine was similar to that described in Example 1, and the yield of the substantially pure product was approximately 68 percent of the theoretical.

Various changes and modifications may be made in the procedure as herein described without departing from the scope of this invention. Thus, the composition of the culture medium may be varied from those herein given as preferred compositions, and the conditions under which the fermentation is carried out as, for example, the agitation, air and carbon dioxide supply rates, temperatures, etc. may be varied.

Alternative methods, and modifications of the described procedure for the recovery of N-acetylglucosamine will be obvious to those skilled in the art, and these modifications are intended to be within the scope of this invention. Other adsorbent agents such as, for example, alumina, ion exchange resins, etc. may be utilized, and various eluting liquids, including both acids and neutral solvents, may be employed.

Such changes and modifications as come within the spirit and scope of the appended claims are to be considered as part of this invention.

We claim:

1. The process of producing N-acetylglucosamine which comprises propagating a mold of the Aspergillus genus selected from the group which consists of *Aspergillus terreus* and *Aspergillus alliaceus* said propagation being carried out in a nutrient medium containing chitin, nitrogen and inorganic salts supplying the elements potassium, phosphorus, magnesium and sulfur, said nutrient medium having an initial pH, at the commencement of the propagation, falling within the range 3.5 to 6.0, and said propagation being carried out under aerobic conditions for a period of time ranging from about 20 to about 24 hours and at a temperature of approximately 32° C.; and then saturating said propagating mold and medium with carbon dioxide gas, whereby the N-acetylglucosamine produced during the fermentation is converted to a form in which it may be readily recovered from said medium.

2. The process as defined in claim 1 wherein an additional amount of chitin is added after said aerobic propagation of said mold has been carried out for a period ranging from about 8 hours to about 20 hours after the commencement of said propagation.

References Cited in the file of this patent

Biochemical Journal (London), vol. 61, pp. 579–586 (1955).

Journal of General Microbiology, vol. 11, pp. 150-158.